United States Patent
Chatterjee et al.

(10) Patent No.: US 6,928,514 B2
(45) Date of Patent: Aug. 9, 2005

(54) METHOD AND APPARATUS FOR TEAMING STORAGE CONTROLLERS

(75) Inventors: Paresh Chatterjee, Fremont, CA (US); Parag Ranjan Maharana, Fremont, CA (US)

(73) Assignee: LSI Logic Corporation, Milpitas, CA (US)

( * ) Notice: Subject to any disclaimer, the term of this patent is extended or adjusted under 35 U.S.C. 154(b) by 365 days.

(21) Appl. No.: 10/212,359

(22) Filed: Aug. 5, 2002

(65) Prior Publication Data

US 2004/0024962 A1 Feb. 5, 2004

(51) Int. Cl.$^7$ .............................................. G06F 12/00
(52) U.S. Cl. ............................. 711/114; 714/5; 714/44
(58) Field of Search ........................... 711/114; 710/74, 710/14; 714/5

(56) References Cited

U.S. PATENT DOCUMENTS

| | | | | |
|---|---|---|---|---|
| 6,401,170 | B1 * | 6/2002 | Griffith et al. | 711/114 |
| 6,654,831 | B1 * | 11/2003 | Otterness et al. | 711/114 |
| 6,701,411 | B2 * | 3/2004 | Matsunami et al. | 711/114 |
| 2002/0019897 | A1 * | 2/2002 | Cruyningen | 711/114 |
| 2003/0097525 | A1 * | 5/2003 | Aruga | 711/114 |
| 2003/0204671 | A1 * | 10/2003 | Matsunami et al. | 711/112 |
| 2004/0034737 | A1 * | 2/2004 | Fujimoto et al. | 711/114 |
| 2004/0049710 | A1 * | 3/2004 | Ashmore et al. | 714/5 |
| 2004/0064637 | A1 * | 4/2004 | Fujibayashi et al. | 711/113 |

* cited by examiner

Primary Examiner—Mano Padmanabhan
Assistant Examiner—Paul Baker
(74) Attorney, Agent, or Firm—Yee & Associates (57) ABSTRACT

A high availability storage system is provided in a server. The server includes a plurality of storage controllers. The storage controllers may be connected to storage enclosures that house the physical devices. If one controller fails, the second controller assumes command of the drive array handled by the failed controller with no interruption of server operation or loss of data. The controllers are connected to the physical drives via a channel or bus, such as a small computer systems interface bus. When two or more teaming controllers are active, the channel or bus may be split to increase throughput. A team driver is provided to direct and redirect requests to the appropriate controllers. The team drive may detect a failed controller, rejoin the bus, and assign control of all logical or physical drives to the remaining active controller. The team driver may also detect a new controller being added to the system, slit the bus, and divide the logical drives between the teaming controllers.

30 Claims, 7 Drawing Sheets

METHOD AND APPARATUS FOR TEAMING STORAGE CONTROLLERS

BACKGROUND OF THE INVENTION

1. Technical Field

The present invention relates to data processing systems and, in particular, to storage systems. Still more particularly, the present invention provides a method, apparatus, and program for teaming storage controllers.

2. Description of the Related Art

Redundant Array of Independent Disks (RAID) is a disk subsystem that is used to increase performance and provide fault tolerance. RAID is a set of two or more ordinary hard disks and a specialized disk controller that contains the RAID functionality. RAID improves performance by disk striping, which interleaves bytes or groups of bytes across multiple drives, so more than one disk is reading and writing simultaneously. Fault tolerance is achieved by mirroring or parity. A failed drive can be hot swapped with a new one, and the RAID controller automatically rebuilds the failed drive's data.

RAID systems come in all sizes from desktop units to floor-standing models. Some implementations include a plurality of RAID storage controllers, each accessing a set of disks. Several physical disks may form a logical drive or volume. However, sets of physical drives are connected to respective controllers. If a controller fails, the physical drives, as well as the corresponding logical drives, become inaccessible.

Therefore, it would be advantageous to provide an improved mechanism for providing fault tolerance between storage controllers.

SUMMARY OF THE INVENTION

The present invention provides a high availability storage system in a server. The server includes a plurality of storage controllers. The storage controllers may be connected to storage enclosures that house the physical devices. If one controller fails, the second controller assumes command of the drive array handled by the failed controller with no interruption of server operation or loss of data. The controllers are connected to the physical drives via a channel or bus, such as a small computer systems interface bus. When two or more teaming controllers are active, the channel or bus may be split to increase throughput. A team driver is provided to direct and redirect requests to the appropriate controllers. The team driver may detect a failed controller, rejoin the bus, and assign control of all logical or physical drives to the remaining active controller. The team driver may also detect a new controller being added to the system, split the bus, and distribute the logical drives between the teaming controllers to achieve high throughput and load balance.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention the practical application to enable others of ordinary skill in the art to understand the invention for various embodiments with various modifications as are suited to the particular use contemplated.

Figure 1:
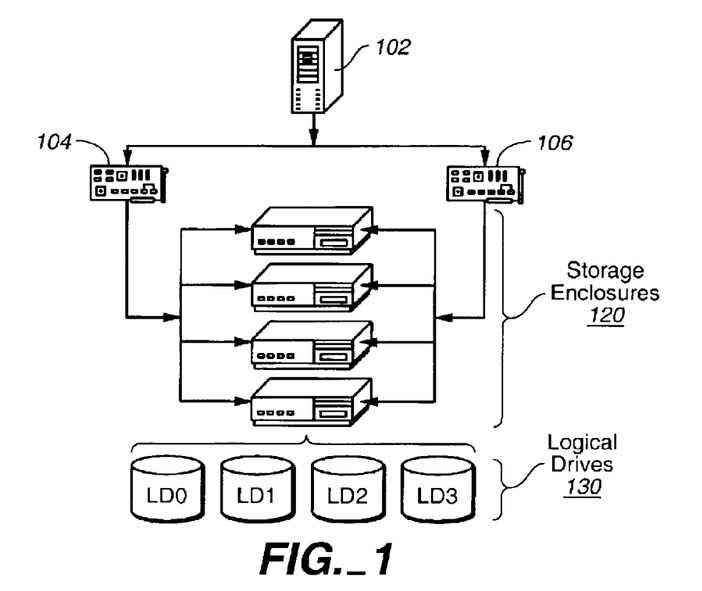
FIG. 1 is a block diagram illustrating an overview of a storage system with storage controller teaming in accordance with a preferred embodiment of the present invention.

With reference now to the figures and in particular with reference to FIG. 1, a block diagram illustrating an overview of a storage system with storage controller teaming in accordance with a preferred embodiment of the present invention. A host device, such as server 102, is connected to storage enclosures 120 via storage controllers 104, 106. Logical drives 130 are created in the storage enclosures. These logical drives, LD0, LD1, LD2, and LD3, are visible to both controllers. Storage controllers 104, 106 may be, for example, SCSI adapters connected to server 102 through a peripheral component interconnect (PCI) bus.

In accordance with a preferred embodiment of the present invention, the enclosures house drives with unique identifications. Each controller may include drives connected to, for example, a Small Computer System Interface (SCSI) bus. SCSI is a hardware interface that allows for the connection of a plurality of devices to a single storage controller. The physical drives may be stored and connected to a SCSI bus within a storage enclosure. The enclosure may include an enclosure processor, such as a SCSI accessed fault tolerant enclosure (SAF-TE) processor, to manage the configuration of the drives within the enclosure or SCSI enclosure services (SES) processor.

The enclosure may split the SCSI bus into two segments. The enclosure processor may also join the segments in the event of a failure of one of the adapters. This may be achieved by issuing a command to the enclosure processor. This arrangement provides better channel utilization and throughput by allowing the two SCSI segments to work concurrently when both storage controllers are active.

Figure 2:
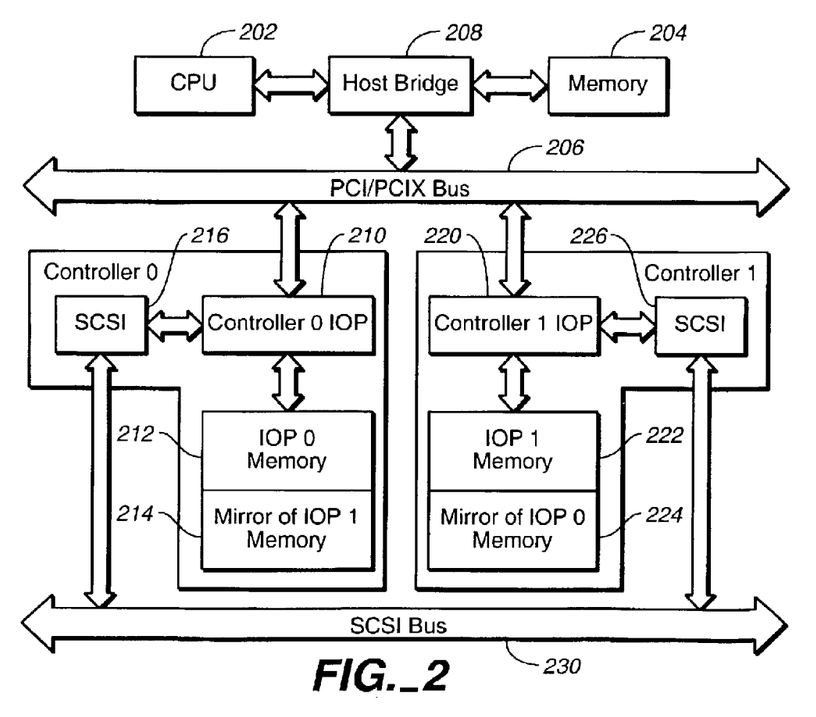
FIG. 2 is a block diagram of a teaming storage system in accordance with a preferred embodiment of the present invention.

With reference to FIG. 2, a block diagram of a teaming storage system is shown in accordance with a preferred embodiment of the present invention. The teaming storage system employs a peripheral component interconnect (PCI) local bus architecture. Although the depicted example employs a PCI bus, other bus architectures such as Industry Standard Architecture (ISA) may be used. Alternatively, a PCI extended (PCIX) or PCI Express architecture may also be used.

Processor 202 and main memory 204 are connected to PCI bus 206 through host bridge 208. Host bridge 208 also may include an integrated memory controller and cache memory for processor 202. Additional connections to PCI local bus 206, such as a local area network (LAN) adapter, audio adapter, graphics adapter, and the like, may be made through direct component interconnection or through add-in boards.

A first storage controller may consist of a controller 0 input/output processor (IOP) 210, SCSI chip 216, and memory 212. Similarly, a second controller may consist of a controller 1 IOP 220, SCSI chip 226, and memory 222. Each SCSI chip may be connected to SCSI bus 230, where all the drives may be connected to this SCSI bus by an enclosure box. In the event WRITE-BACK logical drives are configured, the cache coherency between the two adapters may be maintained by partitioning the cache into two segments. Thus, controller 0 may maintain a mirror of IOP 1 memory 214 and controller 1 may maintain a mirror of IOP 0 memory 224.

In accordance with a preferred embodiment of the present invention, low latency read/write calls via the dedicated, shared SCSI bus are used to provide remote direct memory access (remote DMA or RDMA). Firmware may be used to support up to two such dedicated buses; therefore, if one bus fails, the other bus may take over. When both buses are available, both buses may be used for the RDMA. As such, controller memories may be mirrored by running special RDMA scripts on the SCSI processors. Thus, the memories may be mirrored with minimal overhead on the local processor. The scripts may also have the channels already open, like point-to-point links, so that there is no overhead of arbitration/selection, etc., wherever possible.

In an alternative embodiment, if each controller could access the memory of the other controller, the PCI/PCIX bus and DMA channels may be used to perform remote DMA operations. FIG. 2 shows that the memory of each controller is divided into equal halves when there is a WRITE-BACK logical drive present, where the first half is used for the controller's own cache and the second half is used to mirror the cache of the other controller. When a driver issues a write command in WRITE-BACK mode to controller 0, data in host memory 204 is transferred to the memory of IOP 0 212 via PCI/PCIX bus 206. After completion of the transaction, the firmware may issue a remote DMA to transfer the data in host memory 204 to mirror of IOP 0 224 in controller 1.

Firmware may have the option to perform remote DMA between controllers via the SCSI bus or via the PCI/PCIX bus. When the firmware does remote DMA via the PCI/PCIX bus, the contents of the host memory are transferred to the memory of the controllers using its own DMA. When the firmware decides to perform remote DMA via the PCI/PCIX bus, then both transactions may be overlapped. In other words, the DMA and remote DMA can be issued concurrently from the host memory. In case of remote DMA via the PCI/PCIX bus, the SCSI bus will be free for other activity.

The partitioning of cache may be done dynamically. Therefore, if none of the controllers have WRITE-BACK drives, then the full cache memory will be utilized by its respective controller. Read caching can be enabled/disabled irrespective of whether a controller has WRITE-BACK drives.

In the event of a storage controller adapter failure, the recovery action of the present invention ensures that split SCSI segments are joined through a command to the enclosure processor. Any dirty cache (i.e. writes that have been not written to the physical disks) that belongs to the partition maintained for the failed adapter will be flushed by the operational adapter. The ongoing (incomplete) I/O's will be retried by the good adapter under the control of the driver and firmware. At this point, the cache partitions may be joined so that the working adapter may benefit from having more cache lines.

The driver supports fail over in the first phase, so that in the event of a card failure, the I/O's are routed through the working storage controller card after ensuring cache coherency. The driver may also support hot plugging of a replacement adapter and will fall back to redundant mode. The driver also may support HOT-ADD if the operating system supports PCI HOT-ADD. In the event of a new adapter being added, drive can automatically return to the redundant mode. HOT-ADD may require PCI configuration space allocation and requisite operating system support.

It should be noted that an enclosure may not support splitting of the SCSI bus. Thus, the architecture shown in FIG. 2 may support two SCSI segments to remain connected at all times. However, if the enclosure processor supports a SCSI split command, splitting the SCSI bus into segments may result in a significant increase in throughput. In order to use SCSI split, all the component drives of a logical drive should be on the same segment of the split.

Those of ordinary skill in the art will appreciate that the hardware in FIG. 2 may vary depending on the implementation. Other internal hardware or peripheral devices, such as flash read-only memory (ROM), equivalent nonvolatile memory, floppy disk, or optical disk drives and the like, may be used in addition to or in place of the hardware depicted in FIG. 2. Also, the processes of the present invention may be applied to a multiprocessor data processing system. The depicted example in FIG. 2 and above-described examples are not meant to imply architectural limitations. Furthermore, the storage system may include more than two teaming storage controllers, depending on the implementation, such as a shared bus architecture that can support multiple initiators.

Figure 3:
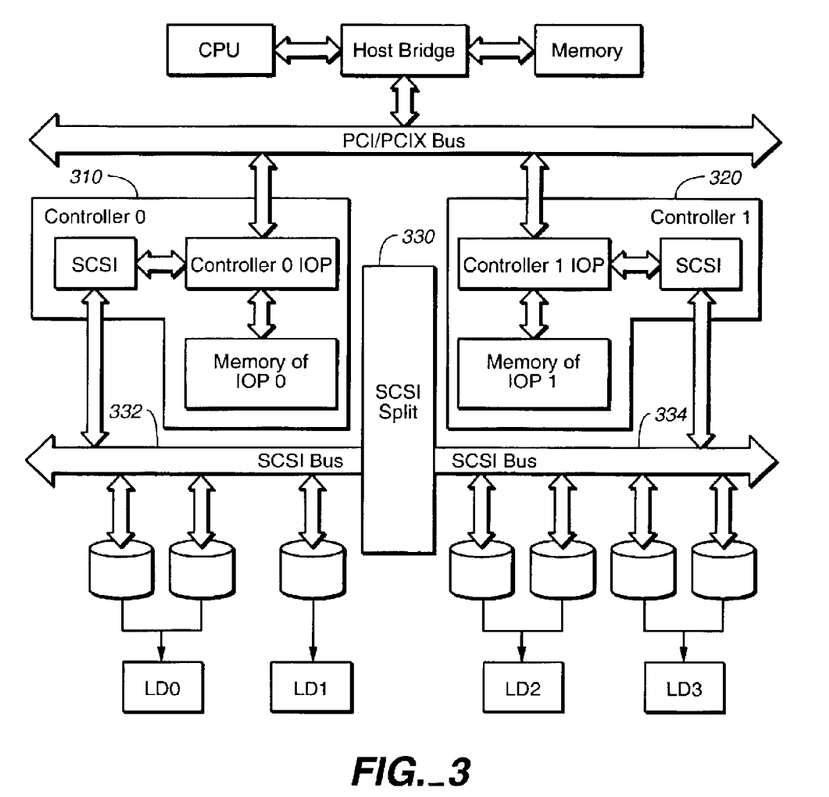
FIG. 3 is a block diagram of an example teaming storage system illustrating the distribution of logical drives in accordance with a preferred embodiment of the present invention.

With reference now to FIG. 3, a block diagram of an example teaming storage system illustrating the distribution of logical drives is shown in accordance with a preferred embodiment of the present invention. In the example shown in FIG. 3, a SCSI SPLIT 330 divides the SCSI bus into a first segment 332 and a second segment 334. In this case, the physical drive components of a logical drive cannot be split across segments.

Under normal working condition the segments are split and both controllers are active. In this case, the I/O's get split by the drivers so that the I/O's directed to a particular logical drive will be executed by the adapter that can access the component physical drives through the particular SCSI segment. For example, an I/O directed to logical drive LD2 would be executed by controller 1 320 through SCSI segment 334. As another example, an I/O directed to logical drive LD1 would be executed by controller 0 310 through SCSI segment 332.

Furthermore, the storage controller teaming mechanism of the present invention may configure a WRITE-THROUGH logical drive to be controlled by both team controllers for higher throughput. When both controllers are handling a single logical drive, they divide the logical drive into logical boundaries and they take ownership of these logical boundaries. These logical boundaries can be, for example, half of the logical drive capacity. Alternatively, the logical drive capacity may be divided into other configurations, depending on the implementation. For example, if a logical drive capacity is 40 GB, the first 20 GB can be handled by a first controller and the other 20 GB can be handled by a second controller. Alternatively, two 10 GB blocks of capacity can be handled by the first controller (first and third 10 GB handled by first controller) and the other two 10 GB blocks can be handled by the second controller (second and fourth 10 GB handled by second controller). If any request falls across these boundaries, then the teaming driver may split such a request into two requests and issue each to its respective owner controller.

Figure 4:
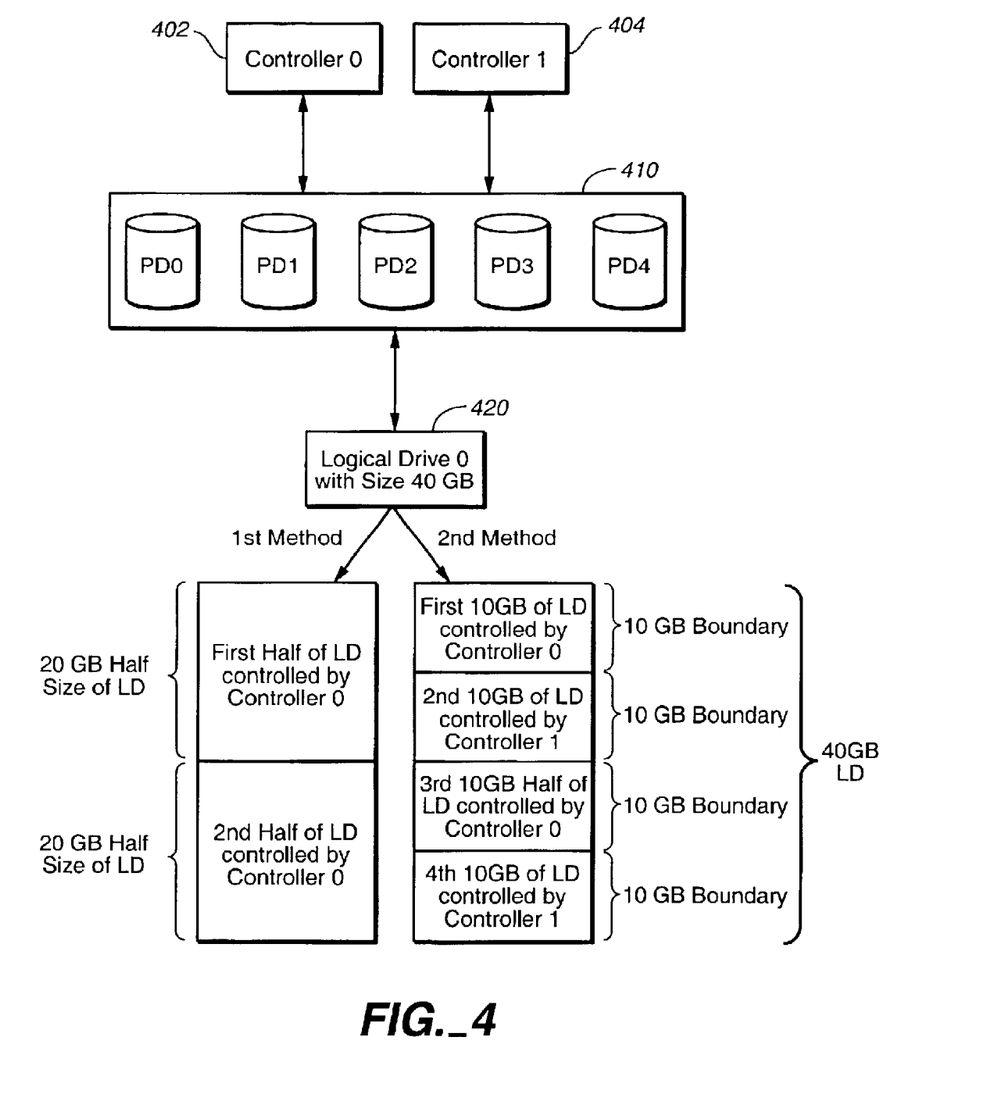
FIG. 4 is a block diagram illustrating an example teaming storage system illustrating the distribution of physical drives that form a single logical drive in accordance with a preferred embodiment of the present invention.

Turning to FIG. 4, a block diagram illustrating an example teaming storage system illustrating the distribution of physical drives that form a single logical drive is shown in accordance with a preferred embodiment of the present invention. In the example shown in FIG. 4, controller 0 402 and controller 1 404 both access a plurality of physical drives 410. The physical drives PD0, PD1, PD2, PD3, and PD4 form logical drive 0 (LD0) 420.

In the example shown in FIG. 4, LD0 has a size of 40 GB. This logical drive may be distributed between the two controllers by the storage controller teaming mechanism of the present invention. Using the first method discussed above, the first 20 GB portion is handled by controller 0 and the other 20 GB portion is handled by controller 1. Using the second method discussed above, first and third 10 GB portions are handled by controller 0 and the second and fourth 10 GB portions of the logical drive are handled by controller 1. The teaming driver splits any request that falls across these boundaries into two requests and issues each of these requests to its respective owner controller.

FIG. 4 is an example configuration and is not intended to imply architectural limitations to the present invention. Other configurations of logical drives with varying sizes, boundaries, and controller distributions may be used within the scope of the present invention.

Figure 5:
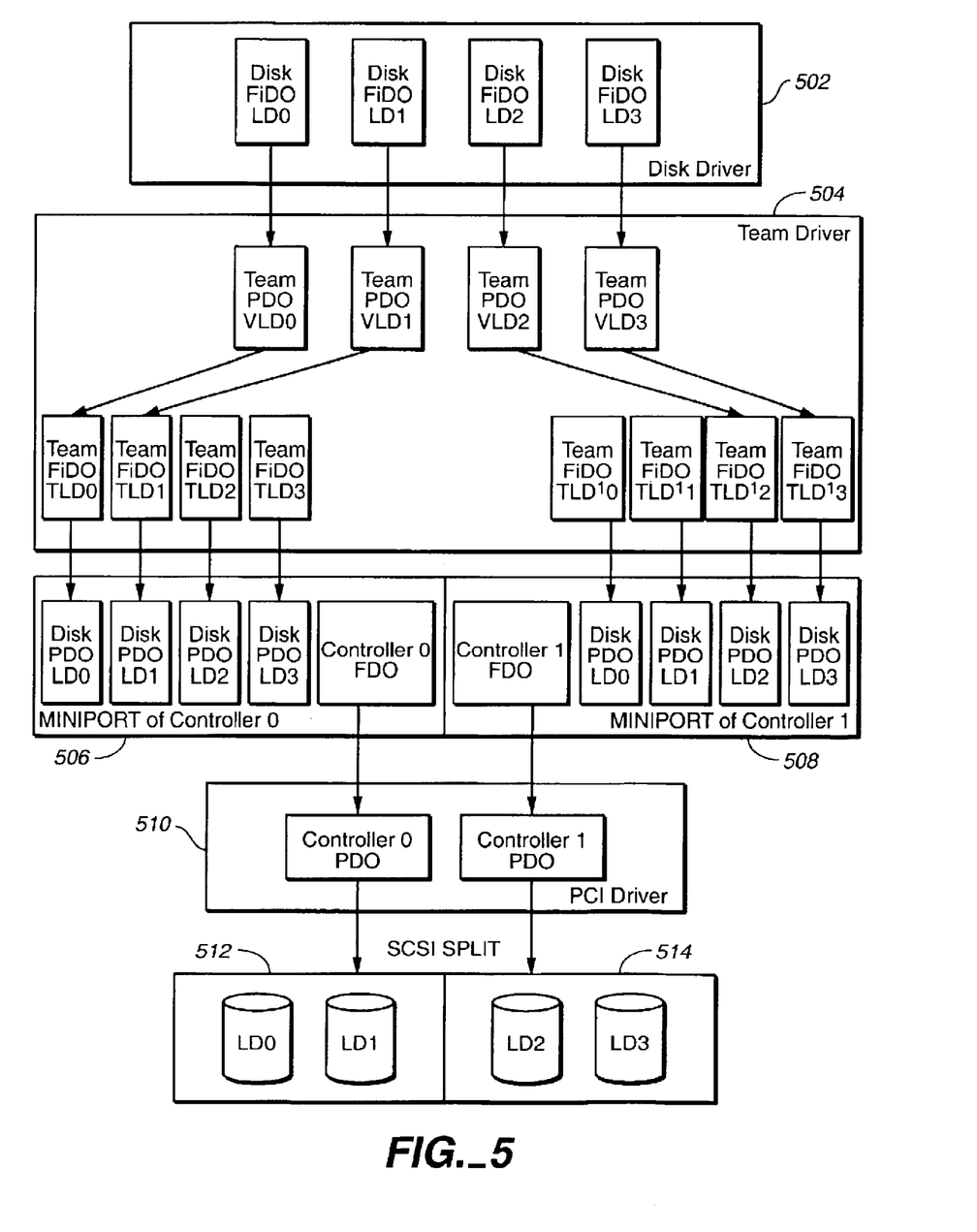
FIG. 5 is a diagram depicting an example driver model in accordance with a preferred embodiment of the present invention.

With reference to FIG. 5, a diagram depicting an example driver model is illustrated in accordance with a preferred embodiment of the present invention. In the example shown in FIG. 5, both controllers are active and logical drives are divided between these controllers. Logical drives LD0 and LD1 512 are controlled by the first controller and logical drives LD2 and LD3 514 are controlled by the second controller.

Before the logical drives can be controlled by two different controllers, team driver 404 issues a SCSI SPLIT command to the enclosure processor so that all physical drives of logical drives LD0 and LD1 will be in one segment of SCSI that is controlled by the first controller. All other logical drives, such as logical drives LD2 and LD3, and their physical drives will be in another segment of SCSI that is controlled by the second controller.

Disk driver 502 is configured to access the logical drives through disk filter device object (FiDO) LD0, disk FiDO LD1, disk FiDO LD2, and disk FiDO LD3. Each controller will be controlled by two drivers via team filter driver 504 and miniport drivers (drivers that control SCSI or RAID controllers) 506, 508. Miniport drivers 506, 508 expose all logical drives as disk physical device object (PDO) LD0, disk PDO LD1, disk PDO LD2, and disk PDO LD3. Miniport driver 506 also includes controller 0 functional device object (FDO) and miniport driver 508 includes controller 1 FDO.

Team driver 504 attaches to each logical drive as pairs of team logical drives (TLD) and creates a virtual logical drive (VLD) for each pair of TLD's. For example, for logical drive LD0, the team driver creates a team PDO VLD0 and a pair of team logical drives, team FiDO TLD0 and team FiDO TLD$^1$0: The team driver will fail any claim or attaching on all TLD's. Therefore standard disk class drivers will not run on TLD's, rather they will run on top of the VLD's that are created by the team driver.

In the example shown in FIG. 5, a first instance of the miniport driver 506 will control the controller 0 and VLD0 and VLD1 will redirect all I/O's via TLD0 and TLD1 . A second instance of the miniport driver 508 will control the controller 1 and VLD2 and VLD3 will redirect all I/O's via TLD$^1$2 and TLD$^1$3. The disk filter device objects are attached to the team virtual logical drives. The disk FiDO's in disk driver 502 are visible to other kernal drivers. Disk management may create partition and mount a file system on VLD's. However, since TLD's are not exposed to disk driver 502, the team driver has the advantage of redirecting I/O's to the appropriate controller. This redirection is transparent to the disk driver.

The team driver reserves each logical drive when it creates the VLD device object in order to prevent automatic background activity, such as AutoRebuild, Background Initialization, etc., in firmware on logical drives. As long as the VLD is present (e.g., not removed or uninstalled), the team driver will reserve the logical drive through one controller or the other and the team driver will not release or reset these logical drives. This will maintain data consistency. When a switch happens, the team driver releases the logical drives from one controller and reserves them for the other controller. This may be achieved with a single command. In this case, a reset is not needed because the same driver controls both controllers in the same system. Reset is used by Microsoft Cluster Service (MSCS) between two nodes of cluster to clear drive reserves.

Figure 6:
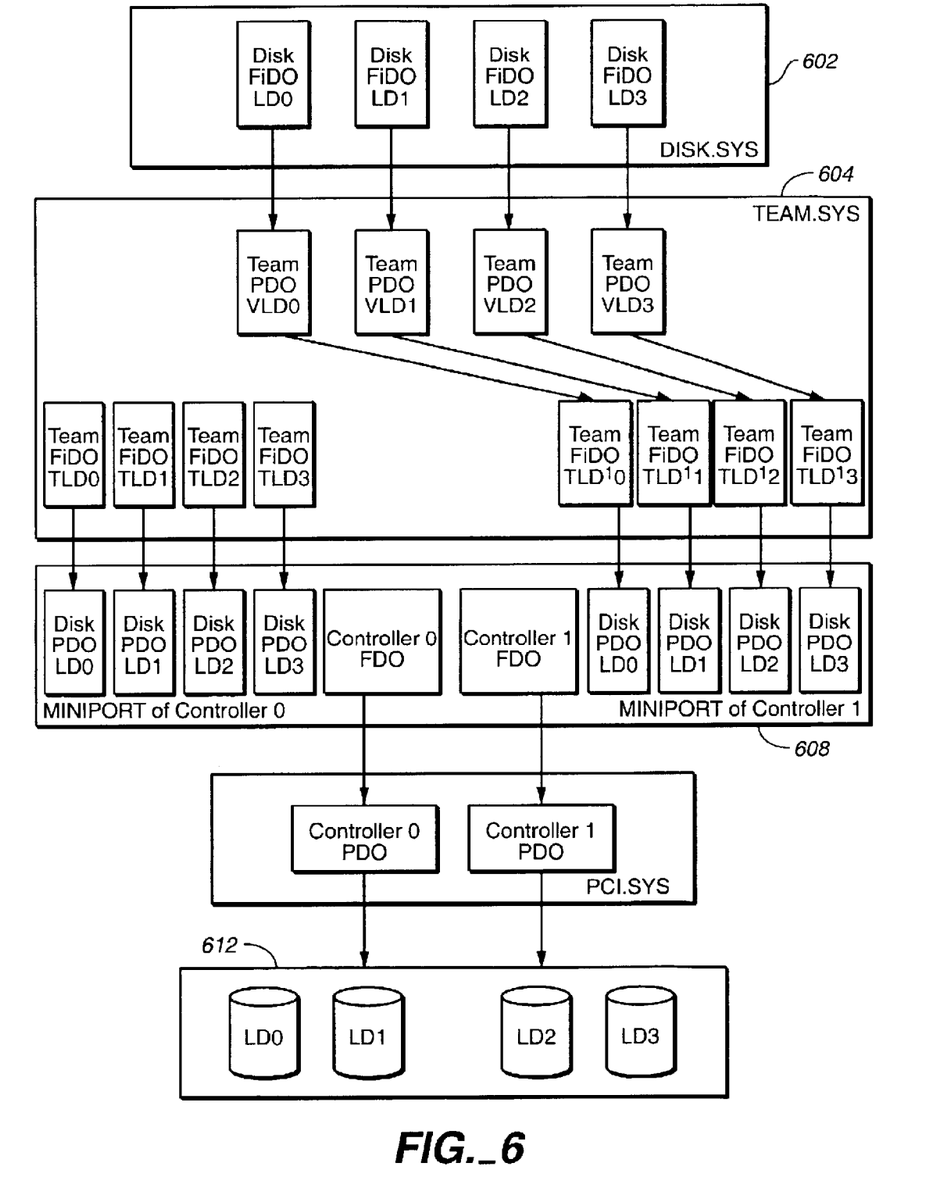
FIG. 6 is a diagram depicting an example driver model with a failed controller in accordance with a preferred embodiment of the present invention.

Turning now to FIG. 6, a diagram depicting an example driver model with a failed controller is illustrated in accordance with a preferred embodiment of the present invention. In the example shown in FIG. 6, team driver 604 detects that controller 0 fails. The team driver may detect controller failure by determining, for example, that no I/O's are being executed. The team driver then rejoins the SCSI and gives control of all the logical drives to controller 1. In order to achieve fail over, the team driver must issue the SCSI REJOIN command to the firmware of controller 1 and then change its target device object to controller 1. If the logical drives are configured as WRITE-THROUGH mode, then the memory of controller 1 will have a copy of the memory of controller 0 (which is not operative now) and flush these cache lines in memory. Thereafter, all I/O's will be redirected from each VLD to $TLD^1 0$, $TLD^1 1$, $TLD^1 2$, and $TLD^1 3$.

After the commands are executed and the VLD's are redirected to the appropriate TLD's for controller 1, every I/O from disk driver 602 will be directed to controller 1 through miniport driver 608 without failure. This will happen without any knowledge of any application running on logical disks 612.

If enabled, a user may HOT-REMOVE the failed controller and add a new controller by HOT-ADD without rebooting the system. When the new controller is added, team driver may detect the new team controller and issue a SCSI SPLIT command. Then, the team driver may change the target devices of VLD0 and VLD1 to TLD0 and TLD1, respectively. As a result, both controllers will be active, VLD0 and VLD1 will be controlled by the new controller, and VLD2 and VLD3 will be controlled by controller 1. Furthermore, due to the SCSI split, when both controllers are active, the bandwidth of I/O's may be almost doubled.

Figure 7:
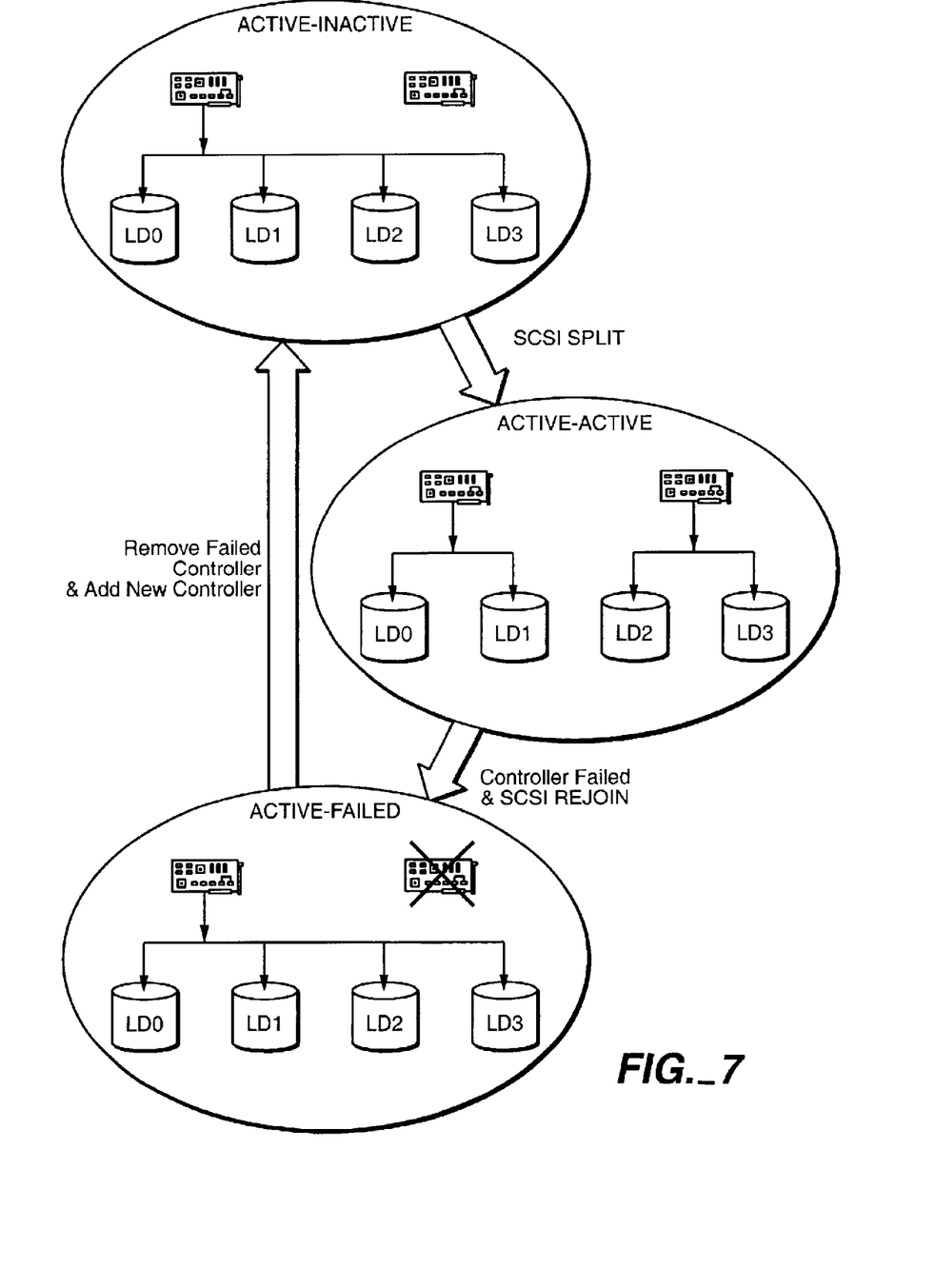
FIG. 7 illustrates a state transition diagram for a team of controllers in accordance with a preferred embodiment of the present invention.

FIG. 7 illustrates a state transition diagram for a team of controllers in accordance with a preferred embodiment of the present invention. When a system initially boots up, the first controller will have all control and own all the logical drives. As soon as the team driver detects that a second team controller is present and that the second team controller does not own any logical drives (ACTIVE-INACTIVE state), it issues a SCSI SPLIT and divides the logical drives between the controllers according to the SCSI SPLIT. Once the logical drives are divided and owned their respective controllers, then the system is in an ACTIVE-ACTIVE state. In this state, both controllers work independently with their own logical drives.

When any controller fails, the active controller issues a SCSI REJOIN. The active controller takes control of all I/O's without failure. Once the ACTIVE-FAILED state is reached, the user may remove the failed controller, such as by HOT-REMOVE if the system supports hot plug PCI. If the user wishes to return to ACTIVE-ACTIVE mode, then the user may first add a new controller to return to the ACTIVE-INACTIVE configuration. The team drive may then detect the new controller and return to the ACTIVE-ACTIVE mode by issuing a SCSI SPLIT.

Figure 8:
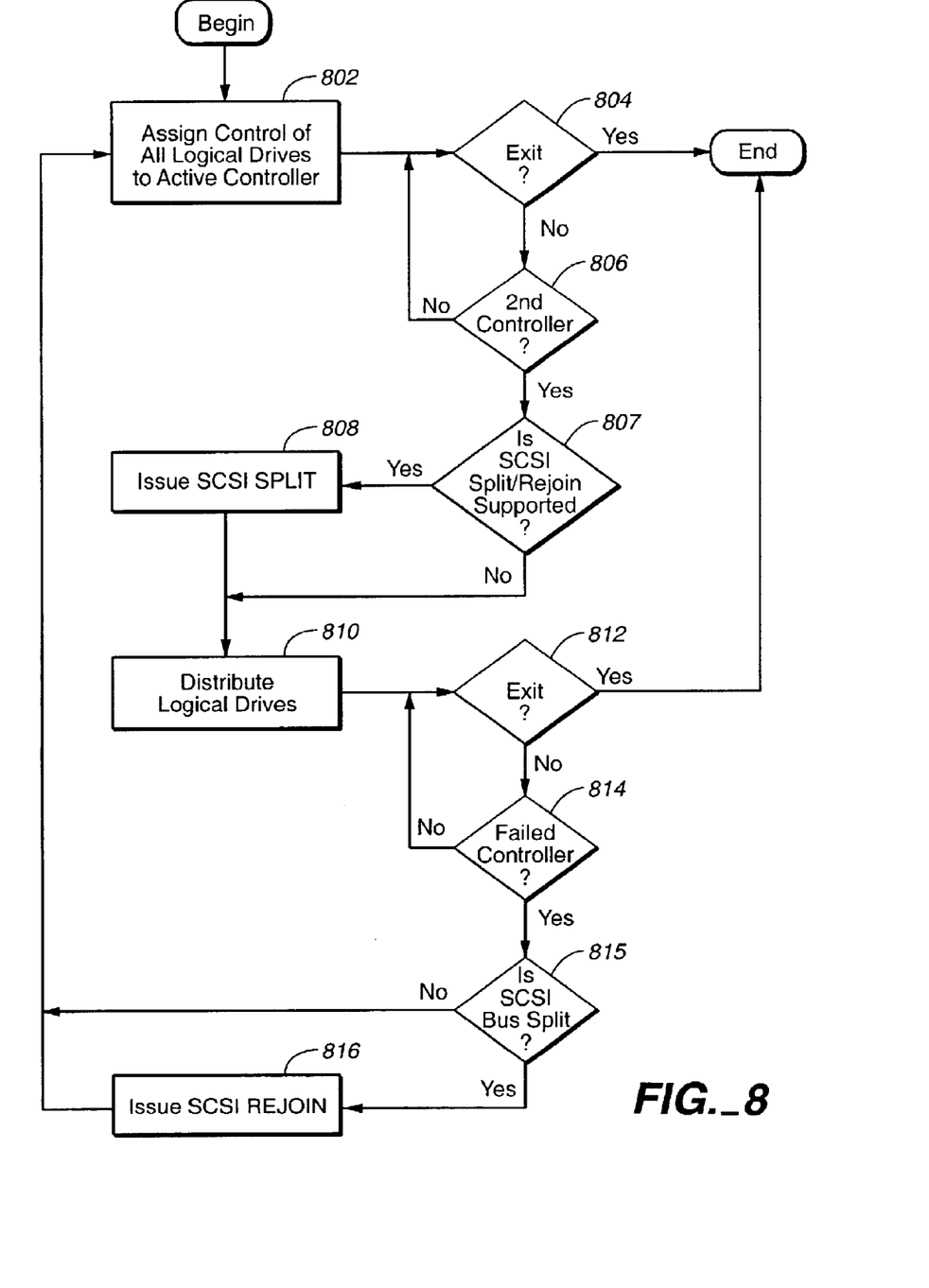
FIG. 8 is a flowchart illustrating the operation of a storage controller teaming mechanism in accordance with a preferred embodiment of the present invention.

With reference now to FIG. 8, a flowchart illustrating the operation of a storage controller teaming mechanism is shown in accordance with a preferred embodiment of the present invention. The process begins and assigns control of all logical drives to the active controller (step 802). A determination is made as to whether an exit condition exists (step 804). An exit condition may exist, for example, when the system is shut down or fails. If an exit condition exists, the process ends.

If an exit condition does not exist in step 804, a determination is made as to whether a second active controller is detected (step 806). If a second active controller is not detected, the process returns to step 804 to determine whether an exit condition exists. If, however, a second active controller is detected in step 806, a determination is made as to whether SCSI split and rejoin are supported (step 807). If SCSI split and rejoin are supported, the process issues a SCSI SPLIT (step 808) and distributes the logical drives between the controllers (step 810). If SCSI split and rejoin are not supported in step 807, the process proceeds to step 810 to distribute the logical drives between the controllers. Next, a determination is made as to whether an exit condition exists (step 812). If an exit condition exists, the process ends.

If an exit condition does not exist in step 812, a determination is made as to whether a failed controller is detected (step 814). If a failed controller is not detected, the process returns to step 812 to determine whether an exit condition exists. If, however, a failed controller is detected in step 814, a determination is made as to whether the SCSI bus is split (step 815). If the SCSI bus is split, the process issues a SCSI REJOIN (step 816) and returns to step 702 to assign control of all logical drives to the active controller. If the SCSI bus is not split in step 815, the process returns to step 802 to assign control of all logical drives to the active controller.

Thus, the present invention solves the disadvantages of the prior art by providing a high availability storage system in a server. The server includes a plurality of storage controllers. The storage controllers may be connected to storage enclosures that house the physical devices. If one controller fails, the second controller assumes command of the drive array handled by the failed controller with no interruption of server operation or loss of data. The controllers are connected to the physical drives via a channel or bus, such as a small computer systems interface bus. When two or more teaming controllers are active, the channel or bus may be split to increase throughput. A team driver is provided to direct and redirect requests to the appropriate controllers. The team driver may detect a failed controller, rejoin the bus, and assign control of all logical or physical drives to the remaining active controller. The team driver may also detect a new controller being added to the system, split the bus, and divide the logical drives between the teaming controllers.

In a traditional cluster environment, all logical drives are generally configured in WRITE-THROUGH mode. However, the teaming mechanism of the present invention can configure a logical drive in WRITE-THROUGH mode as well as WRITE-BACK mode. Teaming can work on the same logical drive from a plurality of controllers using predefined segments in logical drive capacity when the logical drive is configured in WRITE-THROUGH mode. Thus, if a large database is mounted on a logical drive, then a first half may be handled by one controller while the second half is handled by a second controller. This will result in a more efficient configuration with less latency and more memory and processor bandwidth.

MSCS issues a reset to clear failed controller reserves. However, the teaming mechanism of the present invention does not issue a reset command when switching controllers with pending I/O's in the initial controller. The teaming mechanism also provides online removal and addition of controllers. Therefore, if a controller has a firmware update, the update may be performed without rebooting the system.

It is important to note that while the present invention has been described in the context of a fully functioning data processing system, those of ordinary skill in the art will appreciate that the processes of the present invention are capable of being distributed in a form of a computer readable medium of instructions and in a variety of forms. Further, the present invention applies equally regardless of the particular type of signal bearing media actually used to carry out the distribution. Examples of computer readable media include recordable-type media such a floppy disc, a hard disk drive, a RAM, a CD-ROM, a DVD-ROM, and transmission-type media such as digital and analog communications links, wired or wireless communications links using transmission forms such as, for example, radio frequency and light wave transmissions. The computer readable media may take the form coded formats that are decoded for actual use in a particular data processing system.

What is claimed is:

1. A method for teaming storage controllers comprising:
    assigning control of a plurality of drives to a first storage controller, wherein the plurality of drives are physical drives connected to a Small Computer System Interface (SCSI) bus in an enclosure having an enclosure processor;
    in response to detecting a second storage controller, distributing the plurality of drives into a first subset of drives for the first storage controller and a second subset of drives for the second storage controller; and
    redirecting access requests for the second subset of drives to the second storage controller,
    wherein the step of distributing the plurality of drives comprises issuing a SCSI split command to the enclosure processor.

2. The method of claim 1, wherein the first storage controller and the second storage controller are Redundant Array of Independent Disk controllers.

3. The method of claim 1, further comprising:
    in response to detecting a failed controller within the first controller and the second controller, directing all access requests to a remaining active controller within the first controller and the second controller.

4. The method of claim 3, wherein the step of directing all access requests to the remaining active controller comprises issuing a SCSI rejoin command to the enclosure processor.

5. The method of claim 1, wherein the first controller has a first memmory and the second controller has a second memory.

6. The method of claim 5, wherein at least one drive within the plurality of drives is configured as a WRITE-BACK drive, the method further comprising:
    dividing the first memory into a first cache memory and a first mirror memory;
    dividing the second memory into a second cache memory and a second mirror memory;
    mirroring the second cache memory in the first mirror memory; and
    mirroring the first cache memory in the second mirror memory.

7. A method for teaming storeage controllers comprising:
    assigning control of a plurality of drives to a first storage controller, wherein the plurality of drives are logical drives and wherein the first storage controller and the second storage controller are Redundant Array of Independent Disk controllers;
    in response to detecting a second storage controller, distributing the plurality of drives into a first subset of drives for the first storage controller and a second subset of drives for the second storage controller, and
    redirecting access requests for the second subset of drives to the second storage controller.

8. A method for teaming storage controllers comprising:
    assigning control of a plurality of drives to a first storage controller, wherein the plurality of drives are physical drives connected to a Small Computer System Interface (SCSI) bus in an enclosure having an enclosure processor,
    in response to detecting second storage controller, distributing the plurality of drives into a first subset of drives for the first storage controller and a second subset of drives for the second storage controller; and
    redirecting access requests for the second subset of drives to the second storage controller,
    wherein the plurality of drives are physical drives that form a logical drive, wherein the step of distributing the plurality of drives comprises dividing the logical drive into a plurality of portions, and wherein the plurality of portions comprises at least a first portion for the first storage controller and at least a second portion for the second storage controller.

9. The method of claim 8, wherein the logical drive is configured as a WRITE-THROUGH drive.

10. A method for teaming storage controllers comprising:
    distributing a plurality of drives into a first subset of drives for a first storage controller and a second subset of drives for the second storage controller, wherein the plurality of drives are physical drives connected to a Small Computer System Interface (SCSI) bus in an enclosure having an enclosure processor;
    directing access requests for the first subset of drives to the first storage controller,
    directing access requests for the second subset of drives to the second storage controller; and
    in response to detecting a failed controller within the first controller and the second controller, redirecting all access requests to a remaining active controller within the first controller and the second controllers, wherein the step of distributing the plurality of drives comprises issuing a SCSI split command to the enclosure processor.

11. The method of claim 10, wherein the first storage controller and the second storage controller are Redundant Array of Independent Disk controllers.

12. The method of claim 10, wherein the step of redirecting all access requests to the remaining active controller comprises issuing a SCSI rejoin command to the enclosure processor.

13. The method of claim 10, further comprising:

in response to detecting a replacement storage controller, redirecting access requests for the second subset of drives to the replacement storage controller.

14. A method for teaming storage controllers comprising:

distributing a plurality of drives into a first subset of drives for a first storage controller and a second subset of drives for the second storage controller, wherein the plurality of drives are logical drives and wherein the first storage controller and the second storage controller are Redundant Array of Independent Disk controllers;

directing access requests for the first subset of drives to the first storage controller, directing access requests for the second subset of drives to the second storage controller; and in response to detecting a failed controller within the first controller and the second controller, redirecting all access requests to a remaining active controller within the first controller and the second controller.

15. A storage system comprising:

a host device;

a first storage controller coupled to the host computer;

a second storage controller coupled to the host computer; and a plurality of drives coupled to the first storage controller and the second storage controller, wherein the plurality of drives are physical drives connected to a Small Computer System Interface (SCSI) bus in an enclosure having an enclosure processor, wherein the host device assigns control of the plurality of drives to a first storage controller, distributes the plurality of drives into a first subset of drives for the first storage controller and a second subset of drives for the second storage controller in response to detecting a second storage controller, and redirects access requests for the second subset of drives to the second storage controller, and wherein the host device distributes the plurality of drives by issuing a SCSI split command to the enclosure processor.

16. The storage system of claim 15, wherein the first storage controller and the second storage controller are Redundant Array of Independent Disk controllers.

17. The storage system of claim 15, wherein the host device directs all access requests to a remaining active controller within the first controller and the second controller in response to detecting a failed controller within the first controller and the second controller.

18. The storage system of claim 15, wherein the first controller has a first memory and the second controller has a second memory.

19. The storage system of claim 18, wherein at least one drive within the plurality of drives is configured as a WRITE-BACK drive, wherein the first memory is divided into a first cache memory and a first mirror memory, wherein the second memory is divided into a second cache memory and a second mirror memory, wherein the second cache memory is mirrored in the first mirror memory, and wherein the first cache memory is mirrored in the second mirror memory.

20. The storage system of claim 15, wherein the host, in response to detecting a failed controller within the first controller and the second controller, directs all access requests to a remaining active controller within the first controller and the second controller by issuing a SCSI rejoin command to the enclosure processor.

21. A storage system comprising:

a host device;

a first storage controller coupled to the host computer;

a second storage controller coupled to the host computer, wherein the first storage controller and the second storage controller are Redundant Array of Independent Disk controllers; and a plurality of drives counted to the first storage controller and the second storage controller, wherein the plurality of drives are logical drives, wherein the host device assigns control of the plurality of drives to a first storage controller, distributes the plurality of drives into a first subset of drives for the first storage controller and a second subset of drives for the second storage controller in response to detecting a second storage controller, and redirects access requests for the second subset of drives to the second storage controller.

22. A storage system comprising:

a host device;

a first storage controller coupled to the host computer;

a second storage controller coupled to the host computer; and a plurality of drives coupled to the first storage controller and the second storage controller, wherein the plurality of drives are physical drives connected to a Small Computer System Interface (SCSI) bus in an enclosure having an enclosure processor, wherein the host device distributes the plurality of drives into a first subset of drives for a first storage controller and a second subset of drives for the second storage controller, directs access requests for the first subset of drives to the first storage controller, directs access requests for the second subset of drives to the second storage controller, and redirects all access requests to a remaining active controller within the first controller and the second controller in response to detecting a failed controller within the first controller and the second controller, and wherein the host device distributes the plurality of drives by issuing a SCSI split command to the enclosure processor.

23. The storage system of claim 22, wherein the first storage controller and the second storage controller are Redundant Array of Independent Disk controllers.

24. The storage system of claim 22, wherein the host device redirects access requests for the second subset of drives to the replacement storage controller in response to detecting a replacement storage controller.

25. The storage system of claim 22, wherein the host redirects all access requests to the remaining active controller by issuing a SCSI rejoin command to the enclosure processor.

26. A storage system comprising:

a host device;

a first storage controller coupled to the host computer;

a second storage controller coupled to the host computer; and a plurality of drives coupled to the first storage controller and the second storage controller, wherein the plurality of drives are logical drives and wherein the first storage controller and the second storage controller are Redundant Array of Independent Disk controllers, wherein the host device distributes the plurality of drives into a first subset of drives for a first storage controller and a second subset of drives for the second storage controller, directs access requests for the first subset of drives to the first storage controller, directs access requests for the second subset of drives to the second storage controller, and redirects all access requests to a remaining active controller within the first controller and the second controller in response to detecting a failed controller within the first controller and the second controller.

27. A computer program product, in a computer readable medium, for teaming storage controllers comprising:

instructions for assigning control of a plurality of drives to a first storage controller, wherein the plurality of drives are physical drives connected to a Small Computer System Interface (SCSI) bus in an enclosure having an enclosure processor;

instructions for distributing the plurality of drives into a first subset of drives for the first storage controller and a second subset of drives for the second storage controller in response to detecting a second storage controller, wherein distributing the plurality of drives comprises issuing a SCSI split command to the enclosure processor; and instructions for redirecting access requests for the second subset of drives to the second storage controller.

28. The computer program product of claim 27, further comprising:

instructions for directing all access requests to a remaining active controller within the first controller and the second controller in response to detecting a failed controller within the first controller and the second controller, wherein directing all access requests to the remaining active controller comprises issuing a SCSI rejoin command to the enclosure processor.

29. A computer program product, in a computer readable medium, for teaming storage controllers comprising:

instructions for distributing a plurality of drives into a first subset of drives for a first storage controller and a second subset of drives for the second storage controller, wherein the plurality of drives are physical drives connected to a Small Computer System Interface (SCSI) bus in an enclosure having an enclosure processor and wherein distributing the plurality of drives comprises issuing a SCSI split command to the enclosure processor;

instructions for directing access requests for the first subset of drives to the first storage controller;

instructions for directing access requests for the second subset of drives to the second storage controller; and instructions for redirecting all access requests to a remaining active controller within the first controller and the second controller in response to detecting a failed controller within the first controller and the second controller.

30. The computer program product of claim 29, wherein redirecting all access requests to the remaining active controller comprises issuing a SCSI rejoin command to the enclosure processor.

* * * * *